Patented Dec. 24, 1940

2,226,427

UNITED STATES PATENT OFFICE 2,226,427

STABILIZED MINERAL OIL

Richard S. George, State College, Pa., and Darwin E. Badertscher, Woodbury, N. J., assignors to Socony-Vacuum Oil Company, Incorporated, New York, N. Y., a corporation of New York No Drawing. Application November 9, 1939,
Serial No. 303,542

6 Claims. (Cl. 252—51)

This invention is directed to the provision of a novel class of compounds capable of inhibiting a viscous mineral oil against the deleterious effects of oxidation.

As is well known, viscous hydrocarbon lubricating oils derived by the refinement of petroleum fractions are susceptible to deterioration with the formation of acidic and sludge products under conditions of storage and use. Acidic products tend to corrode metallic portions of transformers, turbines, engines, etc., and sludge precipitates in and on oil passages, oil transfer tubing and heat transfer surfaces.

Materials capable of preventing this deterioration, usually conceded to arise from oxidation reactions, are spoken of as inhibitors. The present invention is based upon the discovery that certain metal derivatives of glyoximes are capable of accomplishing such inhibition. The present invention has for its object the provision of viscous mineral oils, stabilized against the deleterious effects of oxidation by the use of certain metal derivatives of glyoximes.

Glyoximes are compounds of the general formula:

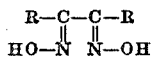

where R represents a hydrogen, or an alkyl radical, and in the present invention interest is particularly directed to alkyl-substituted glyoximes, wherein the R's attached to the carbon atoms are alkyl groups. The alkyls may be either the same or different, and may be of any molecular weight, although preference is had for those relatively simple, straight chain, alkyls of low molecular weight, which give oil soluble glyoximes. As an example of such an alkyl glyoxime, there may be mentioned methyl-n-butyl glyoxime. Glyoximes are capable of further reactions, as for example with metals, to form compounds of the nature of metal salts. Such compounds are herein spoken of as metallic derivatives of glyoximes. The particular metallic derivatives of glyoximes with which this invention is concerned are those formed by metals of the group, nickel, cobalt, and iron, and specifically nickel.

The metal derivatives, for example the nickel derivatives of methyl-n-butyl glyoxime, may be prepared by following the method outlined by Cavell and Sugden (J. Chem. Soc. 1935, 621), as follows:

To 186 grams of ethyl-n-butylacetoacetate (Organic Syntheses, Collective volume I; Wiley, 1932) dissolved in 600 cc. of 10 percent sodium hydroxide solution was added 69 grams of sodium nitrite. The mixture was cooled to below 10° C. and an excess of concentrated hydrochloric acid was added slowly with vigorous stirring. The oximino-ketone separated as an oil.

The oximino-ketone was converted without further purification into the glyoxime. The methyl-n-butyl-glyoxime was prepared by heating together on a water-bath 143 grams of the oximino-ketone, 83.4 grams of hydroxylamine hydrochloride and 500 grams of 20 percent sodium hydroxide solution. The reaction mixture was heated and stirred for approximately three hours. At the end of this time the glyoxime was precipitated by adding acetic acid. The product was washed several times with water and then crystallized from aqueous alcohol.

A solution of 20 grams of methyl n-butylglyoxime in about 250 cc. of 95% ethyl alcohol was added slowly to 16.5 grams of nickelous chloride ($NiCl_2.6H_2O$) and 21 grams of sodium acetate ($NaC_2H_3O_2.3H_2O$) dissolved in about 300 cc. of distilled water. The reaction mixture was kept in an ice bath during the addition of the alcoholic solution of glyoxime. The nickel salt of methyl n-butylglyoxime, which appeared as a bright red precipitate immediately upon the introduction of the solution of the glyoxime, was filtered out, washed several times with water and air dried.

The material so prepared is found to be an inhibitive material under many conditions causing deterioration of lubricating oils, as will be noted.

*Example I.*—Motor oils, especially those refined by certain solvent extraction methods, tend to oxidize when submitted to high temperatures and form products that are corrosive to metal bearings. This corrosive action may be severe with certain bearings such as those of cadmium-silver alloys, and may cause their failure within a comparatively short time. The following test was used to determine the corrosive action of a motor oil on an automobile connecting rod bearing.

A section of a bearing containing a cadmium-silver alloy surface and weighing about 6.0 grams was placed in 30 grams of commercial SAE 20 solvent refined motor oil. The oil was heated to 175° C. for 22 hours while a stream of air was bubbled against the surface of the bearing. The weight loss in milligrams of the bearing is interpreted as a measure of the corrosiveness of the oil. In each case a sample of the oil containing the addition agent was run concurrently with a sample of the straight oil. Each sample contained a section cut from the same bearing.

| Material added, percent | Milligrams weight loss | |
|---|---|---|
| | Oil plus addition agent | Straight oil |
| Nickelous methyl n-butylglyoxime, 0.25% | 47 | 72 |

*Example II.*—A very highly refined oil of the type suitable for use in transformers was used. It possessed the following constants: specific gravity, 0.871; flash point, 310° F; Saybolt Universal viscosity at 100° F., 69 seconds. Tests were made by heating oil samples to 120° C. and bubbling oxygen gas through them for 70 hours. Neutralization numbers were then obtained on the samples as a measure of the amount of acids formed.

| Materials added, percent | Neutralization number |
|---|---|
| None | 25.0 |
| Nickelous methyl n-butylglyoxime, 0.10% | 19.2 |
| Nickelous methyl n-butylglyoxime, 0.25% | 8.1 |

*Example III.*—Two types of turbine oils, (1) an acid refined oil with an A. P. I. gravity of 29.4, a Saybolt viscosity of 152 seconds at 100° F., and a flash point of 385° F., (2) a furfural refined oil with an A. P. I. gravity of 34.2, a Saybolt viscosity of 150 seconds at 100° F., and a flash point of 440° F., were used. Tests were made by heating 25 cc. samples of the oils to 200° F. with 5 liters of air per hour bubbling through them. 24 inches of #18 gauge copper wire and 1 gram of iron granules were added to each sample. Also, 2 cc. of distilled water were added each day. The samples were tested for acidity, color and sludge after varying periods of time. The results obtained with the two oils described above, follow:

| | Conc., percent | Time in hours | Acidity (N. N.) | Lovi. color | Sludge mg./25 cc. |
|---|---|---|---|---|---|
| Oil (1) acid refined | | 72 | .14 | 6 | 68 |
| | | 240 | 2.5 | 110 | 246 |
| | | 336 | 16.0 | 400 | 1282 |
| Oil (1)+nickelous methyl n-butylglyoxime | 0.10 | 163 | .3 | 55 | 64 |
| | | 332 | 12.3 | 150 | 705 |
| Oil (2) furfural refined | | 92 | 0.91 | 9 | 33 |
| | | 165 | 20.3 | 320 | 251 |
| Oil (2)+nickelous methyl n-butylglyoxime | 0.10 | 163 | .03 | 25 | 8 |
| | | 332 | .01 | 26 | 26 |
| | | 2013 | .01 | 11 | 1 |

*Example IV.*—A commercial motor oil, SAE 30 grade, refined by the Duo-Sol process, was used. Tests were made by heating 300 gram samples of the oil at 350° F. with 2 liters of air per hour being blown over the surface and stirring at a constant rate with a steel paddle. Samples were withdrawn at specified intervals and the percent sludge by volume determined.

| Material added | Percent by weight | Sludge—Percent by volume | | | | | | |
|---|---|---|---|---|---|---|---|---|
| | | 3 days | 5 days | 7 days | 8 days | 9 days | 10 days | 13 days |
| None | | | | 12 | 18 | 25 | | |
| Nickelous methyl n-butylglyoxime | 1.0 | 1.5 | 2.0 | 2.0 | | 2.0 | 2.0 | 15 |

The inhibitive results obtainable from the use of the compounds herein disclosed may be obtained by the addition to the oil of from about 0.10 to about 5.0 weight percent of the inhibitive material. The preferred concentration is of the order of 0.1 to 1.0 weight percent of the oil to be inhibited.

In general, the use of alkyl substituents of not more than 8 carbon atoms are preferred.

In the specification and claims, reference is made to oil soluble materials. When so used, the term indicates solubility in oil to an extent sufficient to substantially accomplish the desired inhibition.

We claim:

1. A viscous refined lubricating petroleum fraction, stabilized against the deteriorating effects of oxidation by the addition thereto of a small amount of an oil soluble metal derivative of an alkyl substituted glyoxime.

2. A viscous refined lubricating petroleum fraction, stabilized against the deteriorating effects of oxidation by the addition thereto of a small amount of an oil soluble metal derivative of an alkyl substituted glyoxime, the metal being selected from the group nickel, cobalt, iron.

3. A viscous refined lubricating petroleum fraction, stabilized against the deteriorating effects of oxidation by the addition thereto of an oil soluble nickel derivative of an alkyl substituted glyoxime.

4. A viscous refined lubricating petroleum fraction, stabilized against the deteriorating effects of oxidation by the addition thereto of an oil soluble nickel derivative of an alkyl substituted glyoxime in which the alkyl substituents are alkyls having not more than 8 carbon atoms.

5. A viscous refined mineral oil lubricant stabilized against the formation of acidic and sludge products by the addition thereto of from about 0.1 to about 5.0 weight percent of an oil soluble nickel derivative of an alkyl substituted glyoxime.

6. A viscous refined mineral oil lubricant stabilized against the formation of acidic and sludge products by the addition thereto of a small amount, on the order of 0.5 weight percent, of an oil soluble nickel derivative of an alkyl substituted glyoxime.

RICHARD S. GEORGE.
DARWIN E. BADERTSCHER.